Dec. 24, 1946.   J. R. BATES ET AL   2,412,958
PRODUCTION OF SOLID CONTACT MATERIAL
Filed Jan. 23, 1942   3 Sheets-Sheet 1
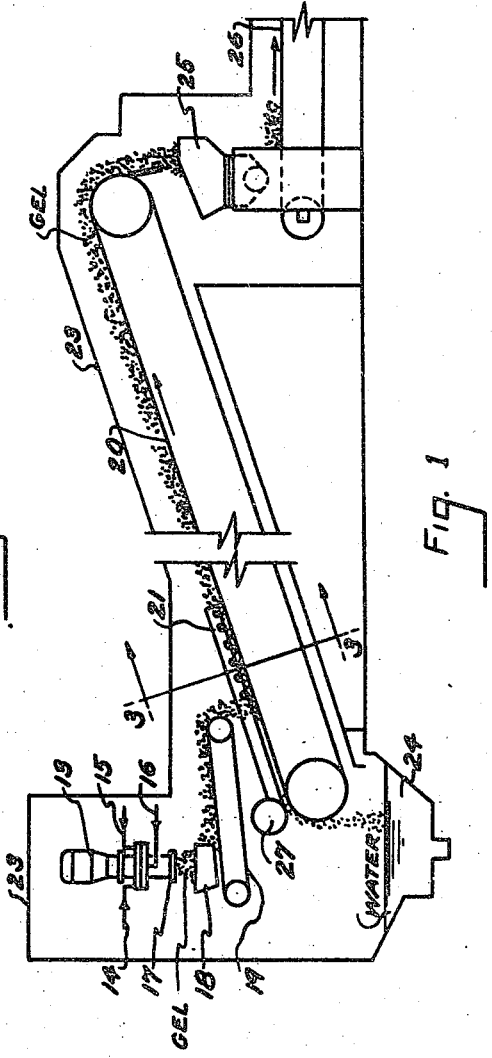
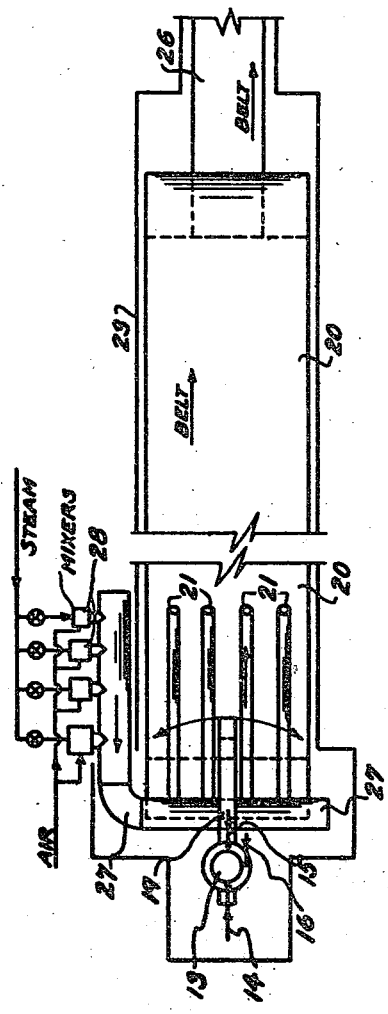
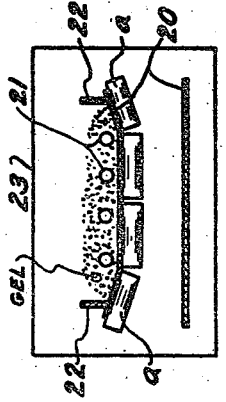
INVENTOR
JOHN R. BATES
HUBERT A. SHABAKER
BY
Ira L. Nickerson
ATTORNEY Dec. 24, 1946. J. R. BATES ET AL 2,412,958
PRODUCTION OF SOLID CONTACT MATERIAL
Filed Jan. 23, 1942 3 Sheets-Sheet 2
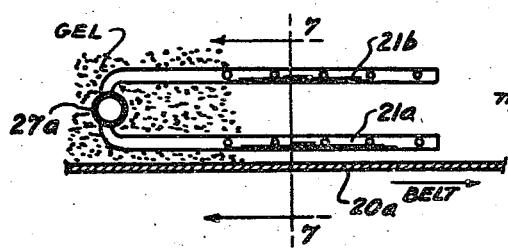
Fig. 6
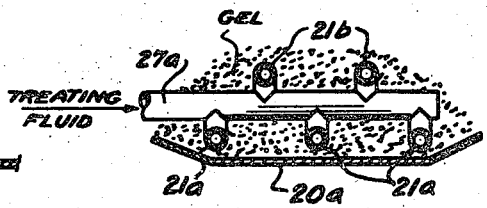
Fig. 7
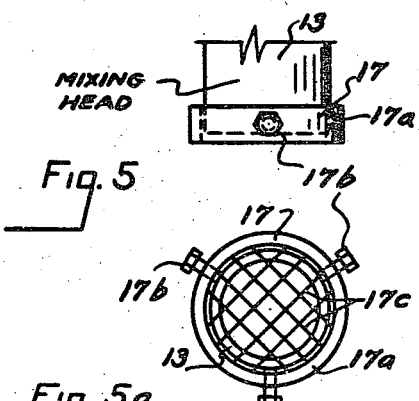
Fig. 5
Fig. 5a
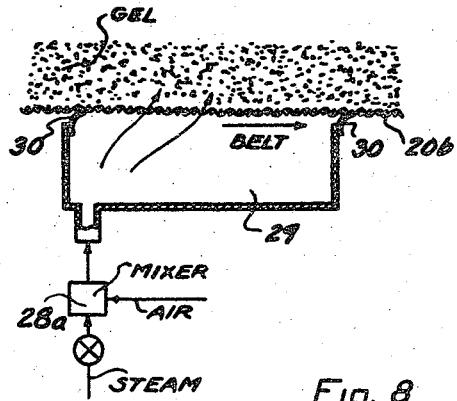
Fig. 8
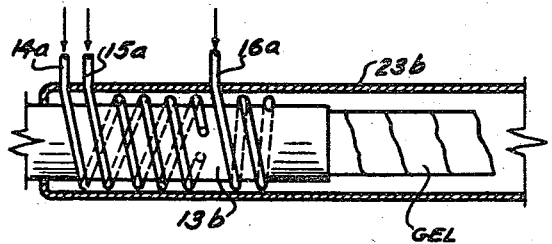
Fig. 11
INVENTOR
JOHN R. BATES
HUBERT A. SHABAKER
BY Ira L. Nickerson
ATTORNEY Dec. 24, 1946.    J. R. BATES ET AL    2,412,958
PRODUCTION OF SOLID CONTACT MATERIAL
Filed Jan. 23, 1942    3 Sheets-Sheet 3
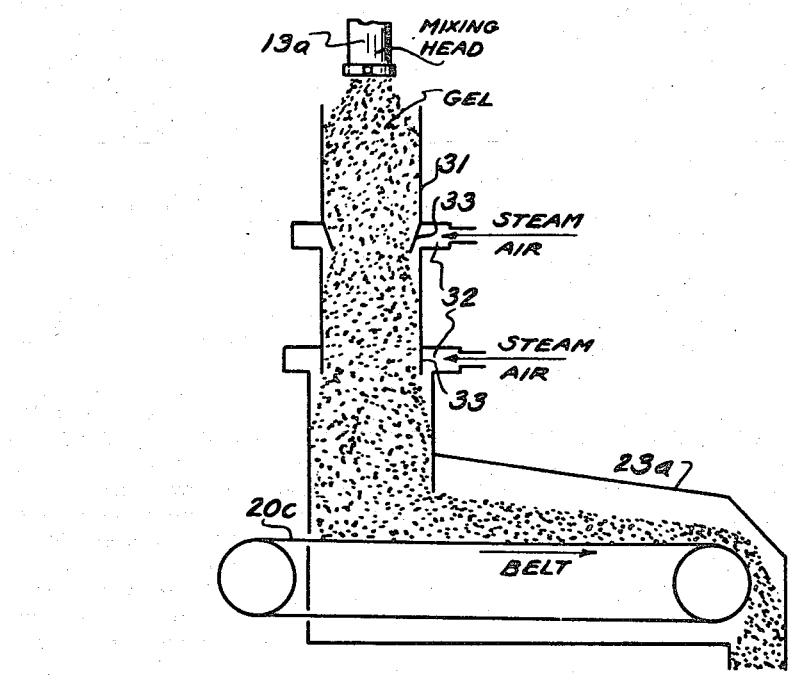
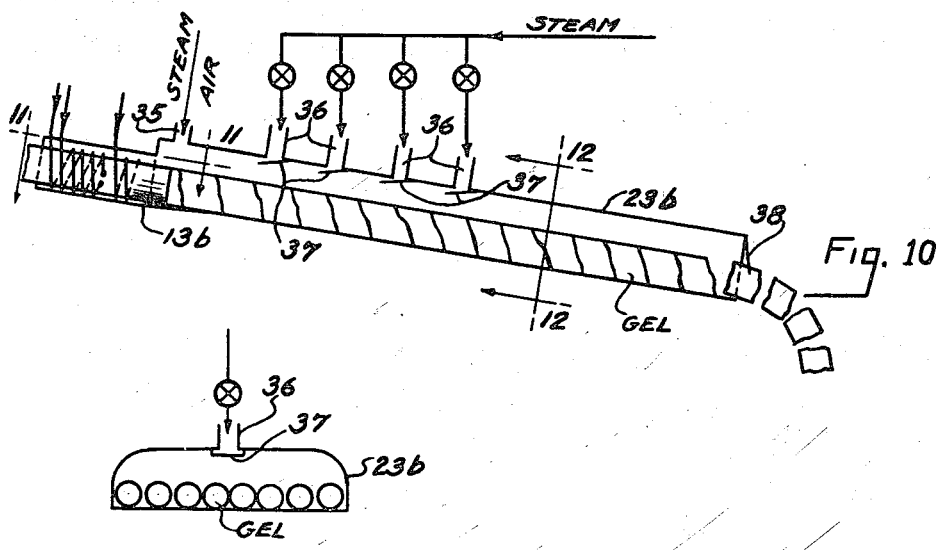
INVENTOR
JOHN R. BATES
HUBERT A. SHABAKER
BY Ira L. Nickerson
ATTORNEY Patented Dec. 24, 1946

2,412,958

UNITED STATES PATENT OFFICE 2,412,958

PRODUCTION OF SOLID CONTACT MATERIAL

John R. Bates, Swarthmore, and Hubert A. Shabaker, Media, Pa., assignors to Houdry Process Corporation, Wilmington, Del., a corporation of Delaware Application January 23, 1942, Serial No. 427,918

4 Claims. (Cl. 252—254)

This invention relates to processes for producing solids having desired physical and chemical properties and resulting from the interaction of solutions. More particularly, it has to do with commercial or large scale production of gels and gelatinous precipitates and the treatment and conversion of the same into forms suitable for ultimate use. It involves both process and apparatus aspects.

"Aging" of a gel following its initial formation has, in many instances, much to do with its subsequent characteristics. In fact, without proper "aging," a gel frequently will not have the desired density or porosity, will have a tendency to disintegrate into powder when stability in lump or granular form is needed, will be incapable of being molded into stable pellet form by extrusion or casting for catalytic or other contacting operations, etc. The simplest method of effecting aging is to let the gel or gelatinous precipitate stand at room temperature for the required length of time, which will vary from a few hours to several days or even longer, depending upon the type or composition of the gel or upon the extent of modification necessary to bring out the desired properties. It has been proposed heretofore to decrease the density of gels by the use of heat, by immersing gels in hot water, etc.

One object of the present invention is to improve the technique of large scale manufacture of synthetic gels. Another object is to effect the manufacture of such gels in a continuous manner. Another object is to control the nature and extent of the "aging" treatment without requiring excessive equipment or delaying or interrupting continuous manufacture of gel. Another object is to devise apparatus for carrying out the above objects. Still other objects will be apparent from the detailed description which follows.

The aging operation should be conducted so as to reduce the density not only of the subsequent dry gel but also of the gel after it has been washed. In the washing operation it is usually necessary for the particles of gel to settle out of the washing water and out of the various agents which may be used to treat the gel during or prior to the washing operation. If the aging operation is carried out to too great an extent the settling characteristics of the gel particles are usually impaired and difficulty is experienced in obtaining a suitable washing operation. In this event, and for the gels showing this phenomenon it is necessary to regulate the amount of aging within certain narrow limits. In other words, in the production of synthetic contact material, for example, the gel must be sufficiently aged to pellet and at the same time be sufficiently dense to settle in the washing operation as for example, in a Dorr thickener or classifier. The present invention rests upon the discovery that this can be done by mixing together two gaseous components to provide a treating medium for the gel so as to quickly reach the proper aging temperature. One of these components is a condensable gas and the other is a non-condensable gas. The maximum temperature obtainable is that equal to the temperature at which the liquid of the liquid phase of the condensable gas reaches the partial pressure of the condensable gas leaving the gel after contacting or passing through it. For example, if a mixture of air and steam is used to treat the gel, the ratio of air to steam will determine the maximum temperature which can be reached by a condensation of steam from the mixture. If a fifty-fifty mixture of air and steam is passed through a gel, the maximum temperature which may be obtained would be that of liquid water at a half atmosphere vapor pressure or approximately 178° F. Actually it is lower than this, since in practice whatever condensation occurs to increase the temperature of the gel decreases the partial pressure of the water in the steam air mixture. Since a maximum temperature is set by the composition of the mixture, local overheating, as will occur with steam alone, is prevented, and temperature gradients are less by reason of the lower maximum temperature and the large amounts of fluid passing over or through the gel. By varying the ratio of steam to air any temperature up to the boiling point of water may be obtained in a controlled manner. This gives a controlled aging to the gel which has been found to be necessary to produce a gel which will pellet to give formed pieces of satisfactory hardness and which will at the same time settle satisfactorily in the washing procedure. In practice the steam may be used to pump the necessary amount of air into a combined stream by means of a pump or ejector, or each fluid may be fed under pressure individually into a mixing chamber, thence into contact with the body of the gel.

In order to illustrate the invention and the manner of its use, concrete forms of apparatus are shown in the accompanying drawings, in which:

Fig. 1 is a side elevational view, partly cut away and in section, of equipment for gel production;

Fig. 2 is a top plan view of the apparatus shown in Fig. 1 with the casing removed;

Fig. 3 is a transverse sectional view substantially on line 3—3 of Fig. 1 showing idlers supporting the upper run of the main conveyor belt;

Fig. 4 is an enlarged cross sectional view of two of the distributing pipes for the treating fluid;

Figs. 5 and 5a are respectively a fragmentary side elevational view and an end elevational view of a mixing head equipped with a gel cutting device;

Fig. 6 is a fragmentary side elevational view partly in section of another belt conveyor and distributing arrangement for the treating fluid;

Fig. 7 is a transverse sectional view on the line 7—7 of Fig. 6;

Fig. 8 is a fragmentary diagrammatic showing of another belt arrangement sectioned longitudinally of the belt;

Fig. 9 is a vertical sectional view of another modification of the invention;

Fig. 10 is a longitudinal sectional view of still another modification of the invention;

Fig. 11 is a horizontal sectional view on the line 11—11 of Fig. 10; and

Fig. 12 is a transverse sectional view on the line 12—12 of Fig. 10 showing a modification thereof.

Figs. 1 and 2 illustrate somewhat diagrammatically commercial equipment for producing gels on a large scale. In the form shown the reactants which combine to form the gel are fed to a mixing head 13 of any suitable or desired type producing substantially instantaneous formation of gel which issues in solid form from the lower end of the head as indicated. Suitable equipment of this type is disclosed in the copending application of H. A. Shabaker, Serial No. 398,731, filed June 19, 1941 (now Patent No. 2,370,200, issued February 27, 1945). There may be any number of connections for reactants to the mixing head, three being shown at 14, 15 and 16. In a typical operation to make silica-alumina gel, for example, sodium silicate solution may be fed through line 14, sodium aluminate solution by line 15, the solutions being thoroughly mixed in the head, and a coagulating agent, such as ammonium sulphate or ammonium chloride solution, being added through line 16 to produce instantaneous gel formation.

The mixing head is preferably provided at its delivery end with a cutter 17, shown on a larger scale in Figs. 5 and 5a, for the purpose of cutting and breaking the gel up into pieces or chunks of suitable size. The cutter illustrated takes the form of an annulus 17a partly telescoped over the exterior of the delivery end of mixing head 13 and rigidly held on the same by machine screws 17b, the annulus having cutting wires 17c extending across the open end of the mixing head. The pieces of gel falling from head 13 are directed by guide 18 to a distributing belt 19 pivoted below the mixing head and arranged to oscillate (by means not shown), as indicated by the arced double-headed arrow in Fig. 2, over a broad main conveyor belt 20 of rubber or flexible material. The oscillating belt 19 distributes the gel pieces in an even layer several inches deep across conveyor belt 20, the pieces piling up around and over a series of equally spaced perforated pipes 21 extending just above conveyor belt 20 and for a portion of the length of the latter. The perforations in the pipes 21 are directed downwardly as indicated in Fig. 4 and discharge the treating fluid or medium, preferably a mixture of steam and air, under pressure into and through the heaped up pieces of gel as conveyor belt 20 drags the gel upwardly along pipes 21. These pipes extend a sufficient distance to heat the entire mass of gel to a desired temperature within the range of 120° to 210° F., as for example to 140° to 180° F. The belt 20 moves slowly so that the heaped up gel is retained thereon for an appreciable length of time, as from ten minutes to two hours depending upon the desired amount of hot aging required, the gel being kept from bouncing off belt 20 at the loading end by side boards 22 (Fig. 3), toward which the sides of the belt are raised by idlers a. Escape of the gaseous treating medium is prevented or restricted by suitable means as by enclosing the main conveyor belt and in fact the entire apparatus in casing 23. The heated gel undergoes syneresis on belt 20, the syneresis water and condensate from the steam-air mixture running down the belt and dropping off the lower end of the same into sump 24 connected to the sewer. By the time the gel reaches the upper end of belt 20 syneresis is practically complete. As indicated, the gel pieces fall into hopper 25 leading to crushing rolls or other equipment for breaking up the gel pieces, which may then be deposited on belt 26 for movement to subsequent drying and/or washing operations.

The hot gaseous treating medium is supplied to distributing pipes 21 from manifold 27, in turn supplied by one or more mixers or thermo-compressors 28 (Fig. 2). While any suitable gaseous or vaporous medium may be used for heating the gel, steam and air are most convenient, the air being used as a diluent to avoid local overheating of the gel at any point as would be likely to happen if steam alone were discharged directly into the gel. The mixers or thermo-compressors 28 not only adjust the temperature of the gaseous heating medium, but also impose a suitable pressure thereon, as up to 10 to 15 pounds per square inch. A back pressure of about four lbs./sq. in. at the orifices of the distributing pipes 21 is usually sufficient.

Figs. 6 and 7 show a modification in which a narrower conveyor belt 20a is utilized and upon which the gel is heaped higher than is the case with equipment shown in Figs. 1, 2 and 3. To insure thorough heating of this deeper mass of gel, the distributing pipes issuing from manifold 27a for the hot gaseous treating medium are provided on different levels or at different distances from belt 20a as indicated. One series of distributing pipes 21a is shown extending a slight distance above belt 20a and a second series of distributing pipes 21b extends parallel to the first series but higher up in the mass of gel and in staggered relation to the pipes of the lower series. Perforations in the pipes direct the treating fluid in all directions to effect thorough and uniform heating of the mass of gel.

Fig. 8 shows a different arrangement in which distributing pipes are omitted and a perforated belt of metal such as link mesh, wire screen, etc. is utilized which will permit the passage therethrough of the treating medium. A chamber 29 of suitable volume and extent is provided immediately beneath belt 20b, to which the hot gaseous treating mixture of steam and air is supplied from mixer 28a. Suitable sealing members, such as flaps 30, at the ends and sides of the enclosure forming chamber 29 are provided to prevent the escape of the treating medium in any direction except upwardly through belt 20b. Chamber 29 is of sufficient extent longitudinally of the belt to insure thorough heating of the entire mass of gel thereon to the desired temperature. A drain (not shown) is arranged for the removal of any syneresis water and condensate which drains through belt 20b into chamber 29.

In Fig. 9 a vertical mass of gel of any desired height is accumulated within an enclosure 31 which is supplied at suitable intervals vertically with the treating fluid which may be admitted from annular chambers 32 protected against the entrance of gel by annular guides 33. The enclosure 31 may be continuously fed with gel by one or more mixing heads 13a disposed at the top thereof, and suitable conveying means, such as belt 20c, may be utilized to withdraw the gel from the lower end of enclosure 31 at a rate which will maintain the latter substantially full of gel at all times. Escape of the treating fluid from the belt area may be restricted by a suitable casing 23a.

In the modification of the invention disclosed in Figs. 10, 11 and 12 the use of belts or other types of travelling conveyors within the heating zone for the gel is entirely avoided, thus simplifying the equipment. One or a battery of mixing heads 13b may be provided as desired or required and there may be a preliminary heating of the reactants prior to their entrance into the mixing head by exterior means (not shown) or by extending the enclosure 23b for the gel so as to surround the mixing head (Figs. 10 and 11) and by coiling the supply lines 14a, 15a and 16a about the mixing head within the enclosure 23b so that the reactant solutions are at least partly heated by the hot treating fluid within the enclosure. Enclosure 23b may be of any suitable or desired length and is disposed or inclined at such an angle that the gel will move therethrough under the pressure of the continually forming gel at the mixing head. The syneresis water and condensate will assist in this movement. A mixture of steam and air at the proper temperature is admitted to enclosure 23b at 35. The proper proportion of steam and air and the proper temperature of the mixture in enclosure 23b is then maintained by admitting steam at intervals through connections 36, as may be necessary or desirable. The steam entering through these openings replaces that lost by condensation within the enclosure 23b and local overheating of the gel is prevented by baffling the inlets 36 as indicated at 37, so that the steam is diluted by the air-steam mixture before it hits the gel. Escape of the gaseous treating medium may be suitably restricted or retarded by a flap 38 of flexible material, such as fabric or leather, over the lower open end of enclosure 23b without interfering with the discharge of the gel therefrom. The enclosure 23b may take the form of a piece of pipe of somewhat larger diameter than the cylinder of gel which issues from the mixing head 13b, as indicated in Fig. 11, or it may be enlarged to accommodate several cylinders of gel in parallelism as indicated in Fig. 12. Either form gives a high degree of flexibility in the manufacture of the gel. When the demand is heavy a maximum number of mixing heads may be utilized and as the demand falls off the number of mixing heads in use may be restricted as desired.

The present invention is particularly advantageous when used in connection with operations designed for a large output of finished gels. The size and extent of the equipment which is required for large scale production is materially decreased if the methods of the present invention are employed. For example, a plant which is preparing as much as a 1,000 lbs./hr. of finished gel must first manufacture wet gel to the extent of 5,000 to 15,000 lbs./hr. or more since these are the reasonable limits of concentration of solutions of reactants which may be employed to produce gels. This is especially true with gels which contain silica as one component. If such large amounts of wet gel must be accumulated for a sufficient time to be satisfactorily aged by previous methods, intervals of time as long as six to twenty-four hours must be provided for. This means that in some instances wet or partially dry gel accumulations of the order of 100,000 to 200,000 lbs. are necessary at a given instant to obtain aging which will produce satisfactory properties in the finished dry gel. It is easy to see that the equipment which could keep in continuous process such large masses of material, which at best is handled with difficulty as far as mechanical and corrosive properties are concerned, requires a large outlay in plant equipment with accompanying high costs. By assuring intimate contact between gaseous media, and especially such media as condense at least in part to give up heat of condensation, such as steam, enables the aging of gel to be carried out with great rapidity. This rapid aging can then be followed by rapid drying without detracting from the good characteristics of the finished product. This means that a plant for the same amount of production may be built with much less equipment and cost. It is necessary, in order to keep the size of drying equipment to a minimum, to dry with reasonable rapidity. The preheating described in the present invention allows of drying times of the order of 3 hours or less, even as low as one-half hour to two hours.

We claim as our invention:

1. In a process of producing contact material from inorganic gel, the improvement which comprises forming said gel from reactants, continuously feeding the gel to an ageing zone while said gel is still in the wet condition and before any substantial ageing has taken place to form a moving bed of gel in said ageing zone and maintaining the bed of gel at sufficient thickness and temperature to rapidly raise its temperature in the range of 120°–210° F., moving the gel through the ageing zone to a drying zone at a temperature within said temperature range and at a rate such that the gel remains in the ageing zone for a substantial period of at least 10 minutes and not to exceed 2 hours, the gel while moving through said ageing zone being contacted with an atmosphere of steam and air to maintain the recited temperature without substantial dehydration of the gel.

2. In the process of producing contact material from inorganic gel, the improvement which comprises continuously supplying freshly formed gel in wet condition to an ageing zone and moving the gel through said zone at a controlled rate to form a moving layer of substantial depth sufficient to retain imparted temperature, heating the gel from within the layer to rapidly raise the temperature thereof to within the range of 120–210° F., retaining the moving layer of gel in an atmosphere of steam and air to maintain the gel at a temperature in the recited range for a substantial period not in excess of two hours to effect ageing of the gel without substantial drying thereof, and continuously withdrawing from the ageing zone liquid formed as a result of syneresis and condensation.

3. In the process of producing contact material from inorganic gel, the improvement which comprises continuously supplying freshly formed hydrogel in wet condition to a treating zone containing a mixture of steam and air maintaining a temperature of 120–210° F., rapidly heating the hydrogel as supplied to said zone, moving the hydrogel through said zone at a controlled rate to remain in said zone for at least ten minutes and not to exceed two hours and to form a moving bed of substantial thickness sufficient to maintain imparted temperature, the temperature and time of treatment being correlated to effect ageing of the hydrogel to impart improved casting characteristics without reduction in density to an extent impairing settling in subsequent washing.

4. Process for treating inorganic gel which comprises continuously feeding the gel in freshly formed wet condition to an ageing zone to form a layer of substantial thickness, rapidly heating the gel by contact with heating conduits embedded within the layer to a temperature in the range of 120–210° F., continuously moving the layer of gel through an atmosphere of steam and air to maintain the gel at a temperature in the recited range and at a rate and for a time effecting ageing of the gel to an extent sufficient to impart improved casting characteristics without reduction in density to an extent impairing settling in subsequent washing.

JOHN R. BATES.
HUBERT A. SHABAKER.